July 9, 1929.  P. KLEIN ET AL  1,719,984
MANUFACTURE OF RUBBER GOODS
Filed June 5, 1925
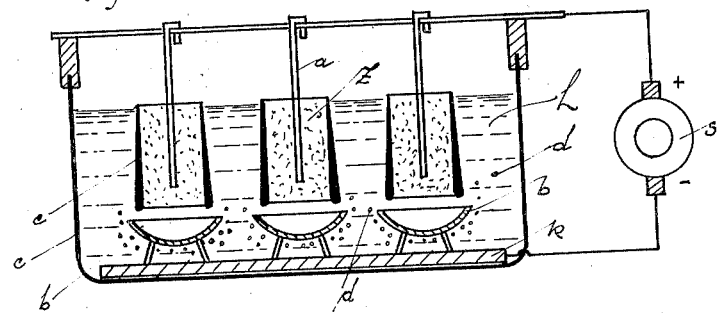
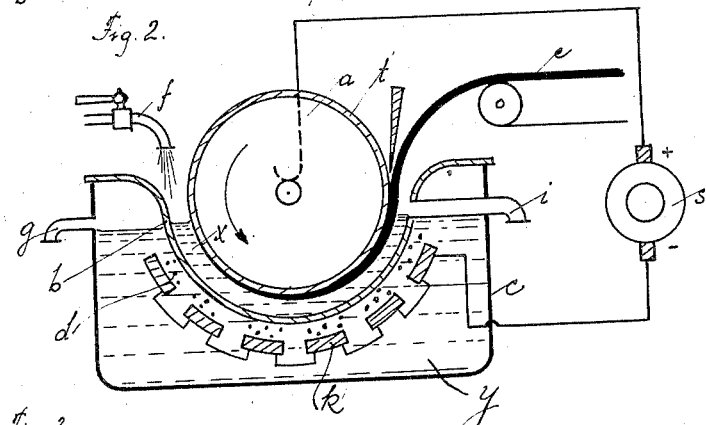
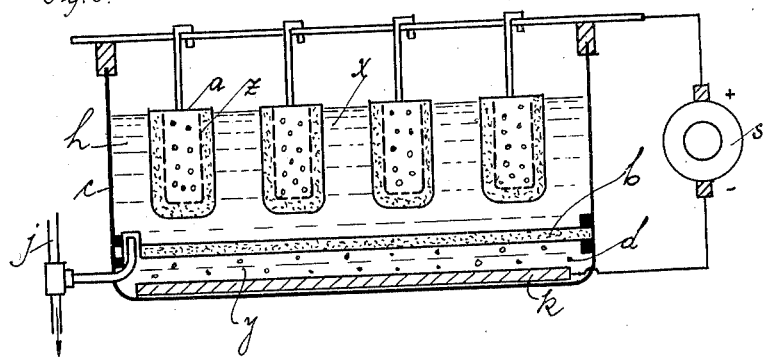
Inventors
Paul Klein
Andrew Szegvári
by Steward & McKay
their attorneys

Patented July 9, 1929.

1,719,984

UNITED STATES PATENT OFFICE.

PAUL KLEIN AND ANDREW SZEGVÁRI, OF BUDAPEST, HUNGARY, ASSIGNORS TO THE ANODE RUBBER COMPANY LIMITED, OF LONDON, ENGLAND.

MANUFACTURE OF RUBBER GOODS.

Application filed June 5, 1925, Serial No. 35,246, and in Great Britain July 31, 1924.

This invention relates to improvements in the concentration, coagulation or deposit of rubber from aqueous dispersions of rubber by means of an electric current.

It is well known that when an electric current passes through a rubber emulsion, for example latex, the rubber particles are driven towards the anode and it has already been proposed to concentrate or to deposit rubber immediately on an electro-conductive anode, for example a metallic anode, or on a diaphragm arranged between the cathode and the electro-conductive anode by means of this method. For the sake of simplicity the anode or the diaphragm onto which the rubber is concentrated from the emulsion in the form of a concentrate or a deposit will be hereinafter termed a "depositing backing".

According to the present invention we insert between the cathode and the depositing backing partitions which are impermeable, permeable or semi-permeable to liquids, according to the desired effect to be produced. Impermeable partitions may be inserted between the cathode and the depositing backing only as screens, while permeable or semi-permeable partitions may close completely the cathode space from the anode space containing the depositing backing, so that the liquid can pass from one space to the other only through the partition which acts as a diaphragm.

In the first case the partition may consist either of non-permeable or of a permeable substance, whilst in the second case the partition must be either completely permeable, for example a fabric, or semi-permeable, for example parchment. In this latter case a constant concentration of the latex can be maintained in spite of the electro-phoretic extraction of its rubber content, or the concentration of the latex may be changed according to a predetermined scheme in the course of the working period.

In this case the term "semi-permeable" means that the diaphragm is completely or substantially impermeable for the rubber particles but completely permeable for water and also completely or substantially permeable for substances contained in the serum of the rubber dispersion, for example sugars, albuminoids and the like.

In the drawing

Fig. 1 is a diagrammatic sectional elevation of an apparatus with a screening partition arranged between the cathode and the depositing mould in a manner not to shut off the cathode space from the space containing the depositing mould.

Figs. 2 and 3 show two examples of an apparatus having a semi-permeable partition completely shutting off the cathode space from the depositing space.

Referring to Fig. 1, $a$ are the anodes embedded in the mould $z$ which may consist, for example of gypsum and form the depositing backings. $k$ is a horizontal cathode located between the anodic mould $z$ and $c$ is a receptacle containing the rubber latex $h$. $s$ is a source of current, supplying current to the electrodes $a$ and $k$. $b$ are cup-shaped bodies, for example of glass, forming impermeable partitions inserted between the cathode and the depositing backings. Said partitions $b$ have a twofold effect. Under the action of the current the rubber is deposited on the moulds $z$ in the shape of a homogenous rubber skin $c$, the bulk of the rubber being deposited on the circumference of said moulds, while a relatively thin deposit, or no deposit at all, will be formed on the bottom of the moulds; on the other hand the gas bubbles $d$ evolved at the cathode are prevented from reaching the rubber deposit so that the homogenity of the deposit is not impaired by the conclusion of gas bubbles.

If the electric screening effect of said partitions $b$ is to be prevented, said partitions may be made of materials permeable to liquids for example of a porous ceramic material, or of fabric having meshes of each size as to prevent the passage of the gas-bubbles leaving the cathode.

If the partition $b$ consists of a permeable or semi-permeable material, it may be so arranged as to completely shut off the space containing the cathode from the space containing the depositing backing so as to allow the liquid to pass from one space into the other only through the partition, which acts as a diaphragm. If the partition is semi-permeable that is to say permeable only to the dispersion medium but not to the rubber globuloids, a concentration may be effected simultaneously by electro-osmotic action.

Fig. 2 shows an apparatus in which the liquid receptacle $c$ is divided into the chambers $x$ and $y$ by means of a diaphragm $b$ of unglazed earthen ware which forms the only passage for the liquid from chamber $x$ into $y$. The chamber $x$ receives the depositing backing, for example the rotary anodic drum $a$, which is connected to the positive pole of the source of current $s$. The rubber may be precipitated directly upon the metallic drum $a$. The drum $a$ may however be provided with an anodic diaphragm, for example with a coating $t$ of gypsum. The cathode $k$ is located within the other chamber $y$. Chamber $x$ has an inlet for the rubber latex, and chamber $y$ has an outlet $g$. Chamber $y$ is filled with an electrolyte. Owing to the electrophoretic action of the electric current, the rubber is collected on the surface of the drum $a$, and the electro-osmotic action of the current at the same time drives the serum liquid of the rubber latex through the diaphragm $b$ into the chamber $y$ from which it issues at $g$. The rubber layer is removed continuously from the revolving drum on the side on which it emerges.

Under certain conditions the rubber latex admitted at $f$ will be separated into two parts in such a manner that its rubber is collected on the drum, while the serum liquid passes through the diaphragm, so that only liquid free from rubber will leave the apparatus at $g$. The chamber $x$ may be provided with an overflow $i$.

In the case illustrated in Fig. 3 the depositing moulds $z$ consist of porous diaphragms, for example of gypsum, in which the electro-conducting anodes $a$ are embedded. The moulds dip into the rubber latex supplied to chamber $x$ which is separated from the chamber $y$ containing the cathode by means of a bottom $b$, forming a permeable diaphragm in such a manner that the liquid can penetrate from the anode chamber $x$ to the cathode chamber $y$ only through said porous diaphragm $b$.

If the cathode chamber is completely shut off from the depositing chamber by means of the diaphragm, the electro-endosmotic action of the current may be assisted by the hydrostatic pressure, or by means of suction. According to Fig. 3 the cathode chamber $y$ is completely shut off from the surrounding air and the outlet $g$ is connected with a suction conduit $j$ assisting the electro-endosmotic action of the electric current.

As will be seen from the above description the production of rubber goods by cataphoretic means may be performed in a continuous process by introducing the rubber dispersion between the anodic depositing moulds or backings and a permeable partition shutting off the chamber containing the rubber dispersion from the chamber containing the cathode and a cathodic electrolyte. The rubber and conditioning agents contained in the rubber dispersion will be substantially deposited on the moulds and the liquid substantially corresponding to the solids deposited will be driven into the cathode chamber and removed therefrom.

It is obvious that the arrangements shown in the several figures can be combined. Such for example in the arrangement shown in Fig. 3, besides the permeable partition $b$, impermeable screens $b$ shown in Fig. 1 may be provided to control the thickness of the deposit at predetermined parts of the depositing backing.

The invention can be applied to any dispersion containing particles in the dispersed phase which migrate under the action of the current towards the anode but is chiefly intended for natural or artificial dispersion of rubber or rubber-like substances either in a vulcanized or unvulcanized state, as well as to guttapercha, balata and the like vegetable resins. Said dispersions may be either in a pure state or admixed with any additional or filling material, which is to be incorporated into the rubber or the like deposit and which is added to said rubber or the like dispersion.

The invention herein described is applicable to methods of electrophoresis generally and particularly to method of the character described and claimed in the United States Patent No. 1,548,689, granted August 4, 1925, to Paul Klein, one of the applicants in this present application.

Having now particularly described and ascertained the nature of our said invention and in what manner the same is to be performed, we declare that what we claim is:—

1. In a process of the character in which the solids of a rubber dispersion are electro-deposited on a depositing backing, the step comprising the interposition between the cathode and the said backing of means capable of preventing the gases evolved at the cathode from contacting with the deposit.

2. The herein described process comprising electro-depositing the solids of a rubber dispersion on a depositing backing, and directing the escape of gases evolved at the cathode so as to prevent their contact with the deposit.

3. The herein described process comprising electro-depositing solids from a dispersion of a rubber compound in aqueous media onto a depositing backing, and removing liquids from said dispersion concurrently with the deposition of solids therefrom.

4. The herein described process comprising electro-depositing solids from a dispersion of a rubber compound in aqueous media onto a depositing backing, and removing liquids from said dispersion by electro-osmosis concurrently with the deposition of solids therefrom.

5. The herein described process comprising electro-depositing solids from a dispersion of a rubber compound in aqueous media onto a depositing backing, removing liquids from said dispersion by electro-osmosis concurrently with the deposition of solids therefrom, and modifying the effectiveness of said electro-osmotic action in removing liquids from the said dispersion by varying the relative pressures to which the dispersion and removed liquids, respectively, are subjected.

6. In an apparatus for the electro-deposition of rubber compounds from dispersions thereof, in combination, a member having anodic properties and on which rubber is adapted to be deposited, a cathode member, a partition interposed between said members and capable of preventing gases evolved at the cathode member from contacting with the deposit on the anodic member.

7. In an apparatus for the electro-deposition of rubber compounds from dispersions thereof, in combination, an anode chamber containing a rubber dispersion, a member having anodic properties on which rubber is adapted to be deposited associated therewith, a cathode chamber containing a cathode member and an electrolyte, and a wall member common to said chambers, said wall member being permeable to liquids but impermeable to solids.

8. In an apparatus for the electro-deposition of rubber compounds from dispersions thereof, in combination, an anode chamber containing a rubber dispersion, a member having anodic properties on which rubber is adapted to be deposited associated therewith, a cathode chamber containing a cathode member and an electrolyte, and a wall member common to said chambers, said wall member being permeable to liquids but impermeable to solids and a poor conductor of electricity.

9. In an apparatus for the electro-deposition of a rubber compound from a dispersion thereof, in combination, a chamber for containing the dispersion, a member having anodic properties on which solids from the dispersion are adapted to be deposited, a cathode, and means, upon the passage of an electric current for depositing solids on the anodic member, for removing liquids from said dispersion.

10. In an apparatus for the electro-deposition of a rubber compound from a dispersion thereof, in combination, a receptacle separated into an anode chamber and a cathode chamber by a partition formed of a material permeable to the liquids of the dispersion but impermeable to the solids thereof, the anode chamber being adapted to contain the dispersion and an anodic member on which the rubber compound is to be deposited, the cathode chamber containing the cathode and an electrolyte, and means connecting the anode and cathode with a source of electric current.

11. In an apparatus for the electro-deposition of rubber compounds from dispersions thereof, in combination, a chamber containing a rubber dispersion, a movable member having anodic properties and on which rubber is adapted to be deposited disposed in said chamber, a second chamber separated from the first chamber by a wall member permeable to the liquids of the dispersion but substantially impermeable to the solids thereof, a cathode in said second chamber, means for admitting rubber dispersions to said first chamber, and overflow means for said second chamber, whereby the apparatus is made operative over long periods of time by the replenishment of the aqueous dispersion to the anode chamber, the withdrawal of the solid constituents of the dispersion on the anode member and the withdrawal of the liquid constituent thereof through the overflow of said second chamber.

12. In an apparatus for the electro-deposition of rubber compounds from dispersions thereof, in combination, a chamber containing a rubber dispersion, a member having anodic properties disposed therein, a second chamber separated from the first chamber by a wall member permeable to the liquids of the dispersion but substantially impermeable to the solids thereof, a cathode in said second chamber, and means for varying the relative pressures within the said two chambers.

In testimony whereof we affix our signatures.

Dr. PAUL KLEIN.
Dr. ANDREW SZEGVÁRI.

CERTIFICATE OF CORRECTION.

Patent No. 1,719,984.             Granted July 9, 1929, to

PAUL KLEIN ET AL.

It is hereby certified that the above numbered patent was erroneously issued to "The Anode Rubber Company, Limited, of London, England", whereas said patent should have been issued to American Anode, Inc., a Corporation of Delaware, said Corporation being assignee by mesne assignments of the entire interest in said invention, as shown by the records of assignments in this office; and that the said Letters Patent should be read with this correction therein that the same may conform to the record of the case in the Patent Office.

Signed and sealed this 19th day of August, A. D. 1930.

(Seal)

M. J. Moore,
Acting Commissioner of Patents.